US006123318A

United States Patent [19]

Forbes et al.

[11] Patent Number: 6,123,318

[45] Date of Patent: Sep. 26, 2000

[54] THROTTLE BODY MODULE HAVING IMPROVED BLADE TO LEDGE SEALING

[75] Inventors: Robert J. Forbes, Whitmore Lake; James Richard Rauch, Grass Lake; Matthew Jon Edwards, Ann Arbor, all of Mich.

[73] Assignee: Visteon Global Technologies, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/260,331

[22] Filed: Mar. 1, 1999

[51] Int. Cl.[7] .............................. F16K 1/22; F16K 25/00; F02D 9/08

[52] U.S. Cl. ............................................ 251/173; 251/306

[58] Field of Search .................................... 251/305, 306, 251/173, 192; 123/337

[56] References Cited

U.S. PATENT DOCUMENTS

| | | | |
|---|---|---|---|
| 4,289,297 | 9/1981 | Nakanishi | 251/306 |
| 4,605,201 | 8/1986 | Miyazaki | 251/305 |
| 5,673,895 | 10/1997 | Kaneko | 251/306 |
| 5,715,782 | 2/1998 | Elder . | |
| 5,746,177 | 5/1998 | Criss et al. . | |
| 5,794,591 | 8/1998 | Kalebjian et al. . | |
| 5,979,870 | 11/1999 | Junier | 251/305 |
| 5,979,871 | 11/1999 | Forbes et al. | 251/305 |

*Primary Examiner*—Kevin Shaver
*Assistant Examiner*—Eric Keasel
*Attorney, Agent, or Firm*—Rhonda L. McCoy-Pfau

[57] ABSTRACT

A throttle body (11) has a through-bore (18), a circular throttle blade (20) of nominal uniform thickness is disposed within the through-bore and on a cylindrical shaft (22). The through-bore has two generally semi-circular ledges (56, 58) spaced upstream and downstream respectively from an imaginary flat plane that contains the shaft axis, each at a distance substantially equal to one-half the blade thickness. One ledge occupies essentially one semi-circumference of the through-bore for sealing with one of the opposite semi-circular perimeters of the throttle blade when the blade is closed, and the other occupies essentially an opposite semi-circumference of the through-bore for sealing with the other semi-circular perimeter of the blade when the blade is closed. The downstream ledge has an upstream facing surface that is flat and perpendicular to the longitudinal axis, and the upstream ledge has a downstream facing surface that departs slightly from a planar one that is flat and perpendicular to the longitudinal axis so as to conform the upstream ledge to a like slight departure in shape of the corresponding semi-circular perimeter of the blade due to engine intake vacuum when the blade is closed.

6 Claims, 2 Drawing Sheets

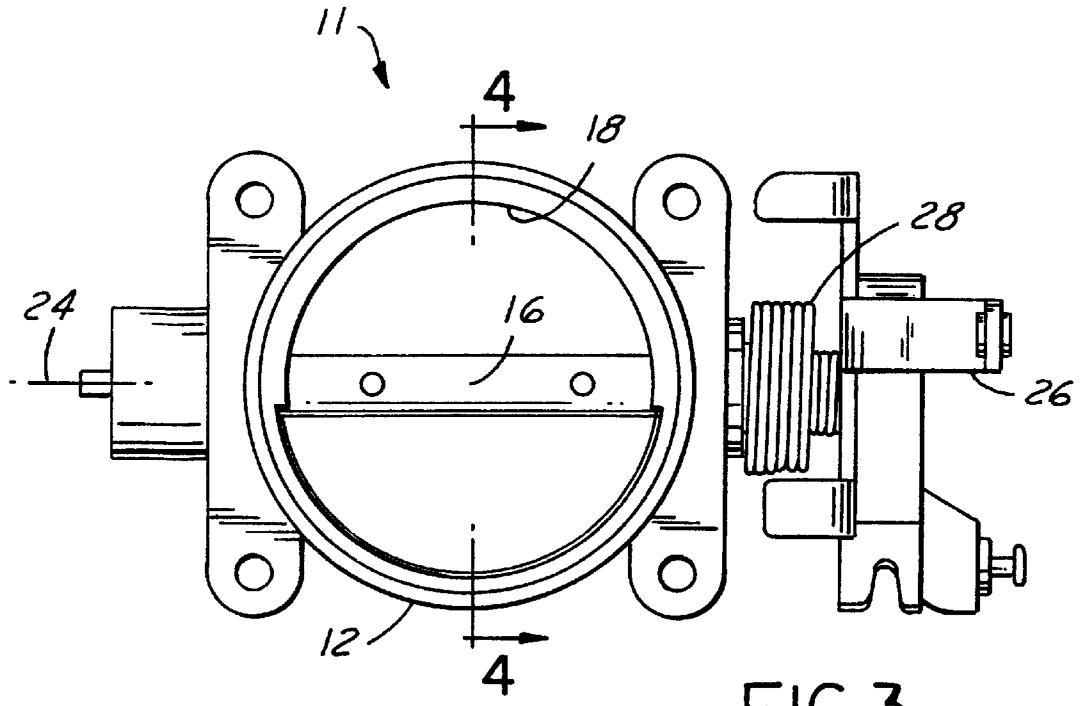
FIG.3
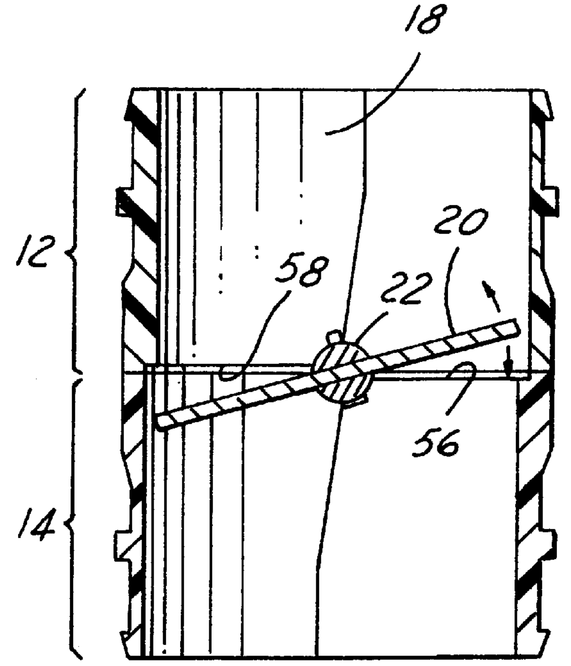
FIG.4
FIG.5
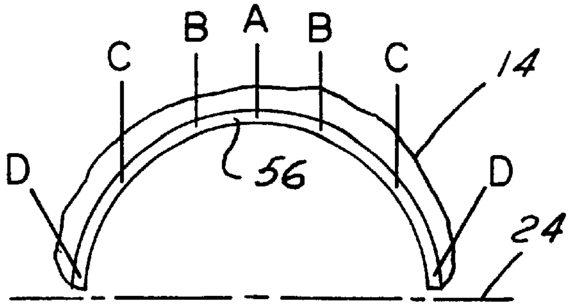

THROTTLE BODY MODULE HAVING IMPROVED BLADE TO LEDGE SEALING

BACKGROUND OF THE INVENTION

1. Field of the Invention

This invention relates generally to throttles for controlling flow through intake systems of internal combustion engines, and more specifically to a throttle body module having improved sealing of a throttle blade to the throttle body wall when in closed position.

2. Background Information, Including Reference To A Related Patent Application And Incorporation By Reference Spark-ignited, fuel-injected internal combustion engines enjoy extensive usage as the powerplants of automotive vehicles. A representative intake system for such an engine comprises a throttle body that has a through-bore within which a throttle blade, or throttle plate, also sometimes referred to as a butterfly, is disposed. The throttle blade is fastened to a cylindrical shaft whose axis is substantially coincident with a diameter of the through-bore. The shaft is journaled on opposite wall portions of the throttle body for motion about its own axis. An actuator that is external to the through-bore selectively positions the shaft about its own axis, to thereby selectively position the throttle blade within the through-bore over a range of positions spanning a closed throttle position and a full open throttle position.

Various throttle bodies are documented in patent, and other, literature. Commonly owned, U.S. Pat. No. 5,979,871 discloses a Clamshell Throttle Body Assembly. That throttle body comprises two body halves that meet face-to-face at a common mating plane that is perpendicular to a central longitudinal axis of the throttle body that coincides with that of a central circular through-bore of the throttle body. The two body halves possess respective confronting faces at the common mating plane, and those faces circumscribe the circular through-bore through which filtered air is conveyed toward combustion chambers of the engine when the throttle body is in use on an engine. Formed in each face of the respective throttle body halves in adjoining relation to the through-bore at each of opposite ends of a diameter of the throttle body that lies in the common mating plane, is one half of a respective circular aperture centered substantially on that diameter. The two faces thereby cooperatively form the two circular apertures, each diametrically opposite the other across the through-bore. Before the two body halves are assembled together, a throttle mechanism comprising a circular throttle blade of uniform thickness disposed on a throttle shaft is placed between the two faces for subsequent capture. As the throttle body halves are moved relative to one another to place their mutually confronting faces on the common mating plane, portions of the shaft that are beyond the perimeter of the throttle blade at each end of the diameter that is coincident with the shaft axis become captured between two confronting halves of each circular aperture at corresponding ends of the diameter. A respective circular annular bearing assembly is disposed on each respective portion of the shaft that is beyond the throttle blade perimeter. Each bearing assembly has an inner circular race, an outer circular race, and a plurality of ball bearing elements, or alternatively roller elements, that are captured between the inner and outer races. In the regions where the bearing assemblies are disposed, each of the two circular apertures cooperatively defined by the throttle body halves is fashioned with confronting circular shoulders that are coaxial with the throttle shaft axis and serve to capture the respective bearing assembly, not only circumferentially, but also in the direction of the diameter of the throttle shaft.

Proximate the confronting faces of the two throttle body halves at the common mating plane, the through-bore wall comprises two generally semi-circular ledges, one in one throttle body half and the other in the other throttle body half. Each ledge is spaced from the common mating plane a distance equal to one-half the thickness of the throttle blade. One ledge occupies essentially one semi-circumference of the throttle body, and the other, essentially an opposite semi-circumference. The throttle blade mounting on the shaft is via a through-slot in the that portion of the throttle shaft which spans the throttle body through-bore. The through-slot has a thickness that is just sufficient to allow the throttle blade to pass through and that is symmetric with respect to the shaft axis. Each ledge is spaced from the common mating plane along the direction of the through-bore axis, a distance equal to essentially one-half the throttle blade thickness. When the throttle blade is in closed position it assumes an orientation that is perpendicular to the through-bore axis, with opposite semi-circular margins of its circular perimeter being disposed flat against the opposite semi-circular ledges.

While the surface-to-surface abutment of the blade perimeter to the ledges in that clam shell type throttle body provides well-defined internal sealing of a flat circular throttle blade to the through-bore when the throttle is closed, it has been discovered that a further improvement in sealing the perimeter of the blade to the ledges can be made. More especially it has been discovered that for a certain thickness of a uniformly thick throttle blade, intake manifold vacuum can impart a slight deformation to the blade when the blade is closed. The blade shape changes from one that is flat and planar throughout to one in which the blade half whose upstream facing perimeter is being forced against the ledge that faces downstream, will bulge slightly rather than remaining perfectly flat. The bulging may negatively influence the sealing effectiveness of the area over which that blade perimeter half bears against that ledge. It is believed that what may seem to be a rather small or inconsequential derogation of sealing effectiveness can in fact affect an engine's ability to comply with relevant specifications and/or regulations, especially when one recognizes that when the throttle blade is closed, a running engine creates substantial intake manifold vacuum. The opposite half of the blade whose downstream facing perimeter is being forced against the ledge that faces upstream does not appear affected in the same way.

The entire content of pending U.S. Pat. No. 5,979,871 is incorporated herein by reference as if fully disclosed herein.

SUMMARY OF THE INVENTION

The present invention provides a solution for the potential diminution of sealing effectiveness that has just been described, and so in certain respects represents a further improvement in the throttle body assembly described in the patent application incorporated by reference.

Other general and more specific aspects will been set forth in the ensuing description and claims.

BRIEF DESCRIPTION OF THE DRAWINGS

The drawings that will now be briefly described are incorporated herein to illustrate a preferred embodiment of the invention and a best mode presently contemplated for carrying out the invention.

FIG. 3 is a top plan view in the direction of arrow 3 in FIG. 1.

FIG. 4 is a cross section view in the direction of arrows 4—4 in FIG. 3.

FIG. 5 is a fragmentary view that has been marked to illustrate the inventive principles in a specific throttle body example.

DESCRIPTION OF THE PREFERRED EMBODIMENT

Figure 2:
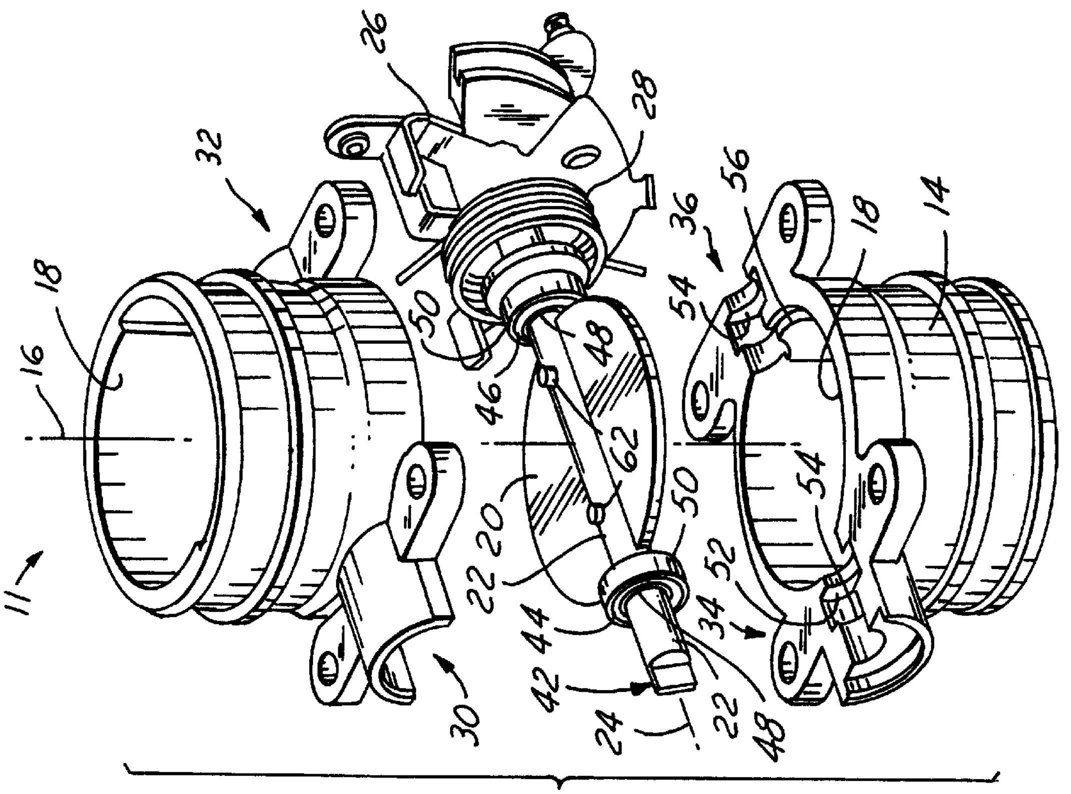
FIG. 2 is an exploded view of FIG. 1.
Figure 1:
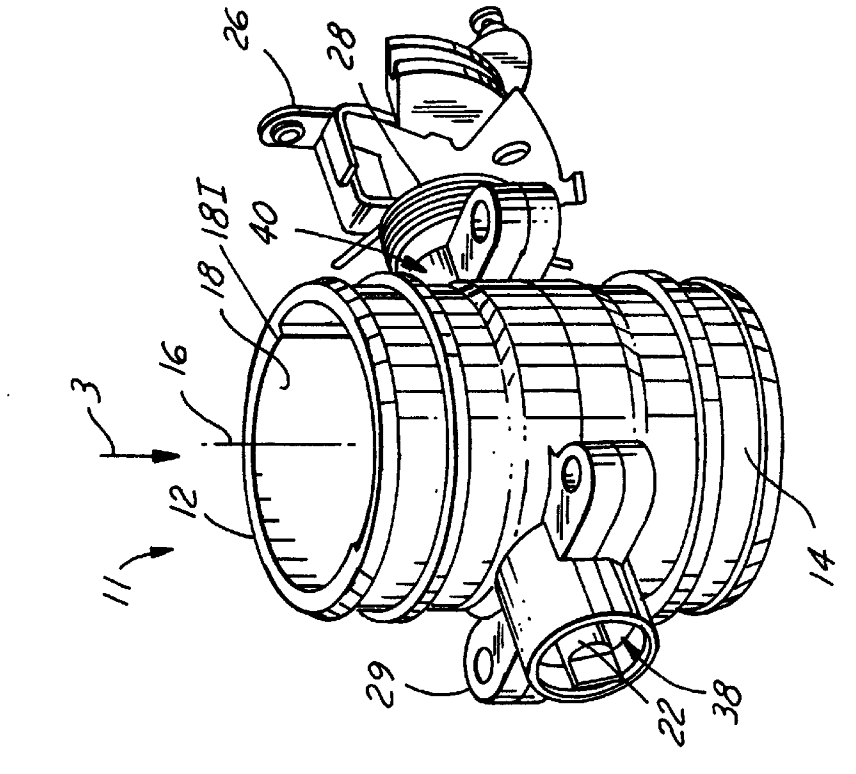
FIG. 1 is a perspective view of an exemplary throttle body in accordance with principles of the present invention.

FIGS. 1–4 show a throttle body 11 that embodies principles of the present invention and comprises first and second body parts 12, 14 that are disposed in succession along an imaginary central longitudinal axis 16. Body parts 12, 14 contain a through-bore 18 of nominally circular transverse cross section centered on axis 16. A throttle blade 20, alternatively sometimes referred to as a throttle plate or butterfly, is disposed within through-bore 18 and fastened to a cylindrical shaft 22 whose axis 24 is substantially coincident with a diameter of through-bore 18. Blade 20 is a circular disk of uniform thickness. Shaft 22 is journaled on opposite wall portions of throttle body 11 for motion about its own axis. Shaft 22 is operated by an actuator (not shown) that is operatively connected to a cam, or lever, 26 that is affixed to an external end of shaft 22. A coiled torsion return spring 28, which may comprise a double-coil, acts between the exterior of throttle body 11 and cam 26 to spring-bias shaft 22, and hence blade 20 as well, about axis 24 to a position that closes through-bore 18. When cam 26 is actuated against the spring bias to selectively position shaft 22 about axis 24, it selectively positions throttle blade 20 within through-bore 18. In this way, throttle blade 20 may be selectively positioned over a range of positions spanning a closed throttle position and a full open throttle position.

Body parts 12 and 14 meet face-to-face at a common mating plane that is perpendicular to axis 16 and that contains axis 24. Parts 12 and 14 possess respective confronting faces at the common mating plane, and those faces circumscribe through-bore 18. Fasteners (not shown) secure parts 12 and 14 together at four external locations 29. Formed in each of the two confronting faces of parts 12 and 14 in adjoining relation to through-bore 18 at each of opposite ends of a diameter of throttle body 11 that lies in the common mating plane, is one half of a respective circular aperture centered on that diameter. Hence, part 12 has half-apertures 30, 32, and part 14, half-apertures 34, 36. The two half-apertures 30, 34 thereby cooperatively form one circular aperture 38, while half-apertures 32, 36 form the other circular aperture 40. The two apertures 38, 40 are diametrically opposite each other across through-bore 18.

Before the two parts 12, 14 are assembled together, a portion of a throttle mechanism 42 that includes throttle blade 20, shaft 22, cam 26, spring 28, as well as two circular annular bearing assemblies 44, 46, is placed between the two faces. Specifically, bearing assemblies 44, 46 are disposed on shaft 22 beyond the perimeter of throttle blade 20 for subsequent capture within the respective apertures 38, 40, while throttle blade 20 is disposed for subsequent placement within through-bore 18. As parts 12, 14 are moved relative to one another to place their mutually confronting faces on the common mating plane, half-apertures 30, 34 close on bearing assembly 44, and half-apertures 32, 36 close on bearing assembly 46.

Each circular annular bearing assembly has an inner circular race 48, an outer circular race 50, and a plurality of ball bearing elements, or alternatively roller elements, that are captured between the inner and outer races to enable the inner race to freely revolve within the outer race. In the regions where bearing assemblies 44, 46 are disposed, each of the two circular apertures 38, 40 has confronting circular shoulders 52, 54 that are coaxial with axis 24 and serve to capture the respective bearing assembly, not only circumferentially, but also in the direction of the length of throttle shaft 22. Apertures 38, 40 capture outer races 50, allowing inner races 52 into which shaft 22 is pressed, to freely revolve, thereby providing low-friction journaling of throttle mechanism 42 on throttle body 11.

Proximate the confronting faces of parts 12, 14 at the common mating plane, the wall of through-bore 18 comprises two generally semi-circular ledges 56, 58, one in part 12 and the other in part 14. Each ledge 56, 58 is spaced from the common mating plane a distance substantially equal to one-half the thickness of throttle blade 20. One ledge occupies essentially one semi-circumference of throttle body 11, and the other, essentially an opposite semi-circumference. The mounting of throttle blade 20 on shaft 22 is via a through-slot 60 in that portion of shaft 22 which spans through-bore 18. Through-slot 60 has a thickness that is just sufficient to allow throttle blade 20 to pass through and that is symmetric with respect to axis 24. Screws 62 secure the attachment of blade 20 to shaft 22.

Ledge 56 is spaced from the common mating plane along the direction of axis 16, a distance equal to essentially one-half the throttle blade thickness. Ledge 56 occupies a planar surface that is flat and perpendicular to axis 16. When blade 20 is closed, its half that closes on ledge 56 assumes an orientation that is essentially perpendicular to axis 16 providing an essentially flush surface-to-surface sealing contact of the corresponding portion of its perimeter margin with ledge 56.

The present invention arises through the discovery that the same is not true of the blade half that closes against ledge 58. While the surface-to-surface abutment of the blade perimeter to both ledges 56, 58 provides well defined internal sealing of a flat circular throttle blade to through-bore 18 when the throttle is closed, it is believed that a further sealing improvement can be obtained by making the downstream facing surface of ledge 58 depart slightly from a planar one that is flat and perpendicular to axis 16. The better fluid tightness resulting from this sealing improvement can be important from the standpoint of engine idle operation and related exhaust emission control when an idle air by-pass valve parallels the throttle to control air flow into the engine at idle when the throttle is closed.

FIG. 5 shows the relationship of ledge 58 to throttle blade 20 in a specific throttle body example. In the example, blade 20 is circular, having a 69.5 mm diameter and a uniform thickness of 2.36 mm. The blade has an outer circular edge that is perpendicular to the blade's opposite flat and parallel circular faces. The surface of ledge 58 departs from one that is flat and perpendicular to axis 16 throughout its full extent.

For describing the surface of ledge 58, assume that the location A, which is farthest from shaft axis 24 (90°) about longitudinal axis 16, is at a zero datum reference to an imaginary plane that is perpendicular to longitudinal axis 16. The locations marked D, which are farthest from location A and proximate shaft 22 (slightly less than 10° from ends of axis 24 as measured about axis 16), are shown 0.18 mm upstream of the datum, upstream being away from inlet 18I of through-bore 18 where intake air enters the throttle body, as marked in FIG. 1. The locations marked C in FIG. 5 (about 45° from ends of axis 24) are shown 0.08 mm upstream from the datum, and those marked B (some 75° from ends of axis 24), 0.03 mm upstream.

The ledge surface is constructed such that at any radial cross section through it, such as shown by FIG. 4, it appears to lie on a plane that is perpendicular to axis 16. The totality of the ledge surface however does not occupy a common plane that is perpendicular to axis 16. Rather, starting at location A and proceeding in clockwise and counterclockwise directions, the surface very gradually ramps, or slopes, toward inlet 18I in both circumferential senses. This allows the ledge surface to better conform to the deformation that occurs in the half of the throttle blade that closes on that ledge when the throttle is operated closed, and thereby enhance the sealing effectiveness of the blade to the throttle body wall despite the slight blade deformation that occurs due to intake manifold vacuum while the blade is closed.

It is to be appreciated that certain details that do not bear directly on the inventive principles may have been neither specifically illustrated nor explicitly described, and it should be understood that good engineering and manufacturing practices are to be employed in practicing the inventive principles in their application to particular throttle bodies.

While a presently preferred embodiment has been illustrated and described, it is to be appreciated that the invention may be practiced in various forms within the scope of the following claims.

What is claimed is:

1. A throttle for an internal combustion engine air intake comprising a throttle body having a through-bore extending along a longitudinal axis for conducting intake flow from an upstream direction toward a downstream direction, a throttle blade disposed within the through-bore and having a nominal uniform thickness and comprising opposite semi-circular perimeters, and a cylindrical shaft to which the blade is fastened, the shaft having an axis of turning substantially coincident with a diameter of the through-bore and being journaled on opposite wall portions of the throttle body for turning about its own axis to selectively position the throttle blade within the through-bore over a range of positions spanning a closed throttle position cloning the through-bore to flow and open positions; the through-bore comprising two generally semi-circular ledges spaced upstream and downstream respectively from an imaginary flat plane that contains the shaft axis, each at a distance from that plane substantially equal to one-half the nominal uniform thickness of the throttle blade, one ledge occupying essentially one semi-circumference of the through-bore for sealing with one of the opposite semi-circular perimeters of the throttle blade when the blade is closed, and the other occupying essentially an opposite semi-circumference of the through-bore for sealing with the other semi-circular perimeter of the blade when the blade is closed, the downstream ledge comprising an upstream facing surface that is flat and perpendicular to the longitudinal axis, and the upstream ledge comprising a downstream facing surface that departs slightly from a planar one that is flat and perpendicular to the longitudinal axis so as to conform the upstream ledge to a like slight departure in shape of the corresponding semi-circular perimeter of the blade due to engine intake vacuum when the blade is closed, wherein the downstream facing surface of the upstream ledge is relatively more upstream at locations immediately proximate opposite ends of the shaft axis than at a location 90° around the longitudinal axis from opposite ends of the shaft axis.

2. A throttle as set forth in claim 1 in which the downstream facing surface of the upstream ledge slopes in the upstream direction in both clockwise and counter-clockwise circumferential senses from a point 90° around the longitudinal axis from the shaft axis.

3. A throttle as set forth in claim 2 in which at any cross section cut through the upstream ledge in a plane that includes the longitudinal axis, the downstream facing surface of the upstream ledge is perpendicular to the longitudinal axis.

4. A throttle for an internal combustion engine air intake comprising a throttle body having a through-bore extending along a longitudinal axis for conducting intake flow from an upstream direction toward a downstream direction, the throttle body comprising a first upstream body part containing an upstream portion of the through-bore and a second downstream body part containing a downstream portion of the through-bore, the two body parts being joined together to register the downstream portion of the through-bore as a continuation of the upstream portion at respective confronting faces of the two body parts, a throttle blade disposed within the through-bore and having a nominal uniform thickness and comprising opposite semi-circular perimeters, and a cylindrical shaft to which the blade is fastened, the shaft having an axis of turning substantially coincident with a diameter of the through-bore and being journaled on opposite wall portions of the throttle body for turning about its own axis to selectively position the throttle blade within the through-bore over a range of positions spanning a closed throttle position closing the through-bore to flow and open positions; the through-bore comprising two generally semi-circular ledges spaced upstream and downstream respectively from an imaginary flat plane that contains the shaft axis, each at a distance from that plane substantially equal to one-half the nominal uniform thickness of the throttle blade, one ledge occupying essentially one semi-circumference of the through-bore for sealing with one of the opposite semi-circular perimeters of the throttle blade when the blade is closed, and the other occupying essentially an opposite semi-circumference of the through-bore for sealing with the other semi-circular perimeter of the blade when the blade is closed, the upstream ledge being formed in the first upstream body part, and the downstream ledge in the second downstream body part, the downstream ledge comprising an upstream facing surface that is flat and perpendicular to the longitudinal axis, and the upstream ledge comprising a downstream facing surface that departs slightly from a planar one that is flat and perpendicular to the longitudinal axis so as to conform the upstream ledge to a like slight departure in shape of the corresponding semi-circular perimeter of the blade due to engine intake vacuum when the blade is closed, wherein the downstream facing surface of the upstream ledge is relatively more upstream at locations immediately proximate opposite ends of the shaft axis than at a location 90° around the longitudinal axis from opposite ends of the shaft axis.

5. A throttle as set forth in claim 4 in which the downstream facing surface of the upstream ledge slopes in the upstream direction in both clockwise and counter-clockwise circumferential senses from a point 90° around the longitudinal axis from the shaft axis.

6. A throttle as set forth in claim 3 in which at any cross section cut through the upstream ledge in a plane that includes the longitudinal axis, the downstream facing surface of the upstream ledge is perpendicular to the longitudinal axis.

* * * * *